June 17, 1969

E. N. OLSON 3,450,357

STATOR WINDING DEVICE

Filed March 13, 1967

INVENTOR.
EDWIN N. OLSON
BY
*Merchant & Gould*
ATTORNEYS

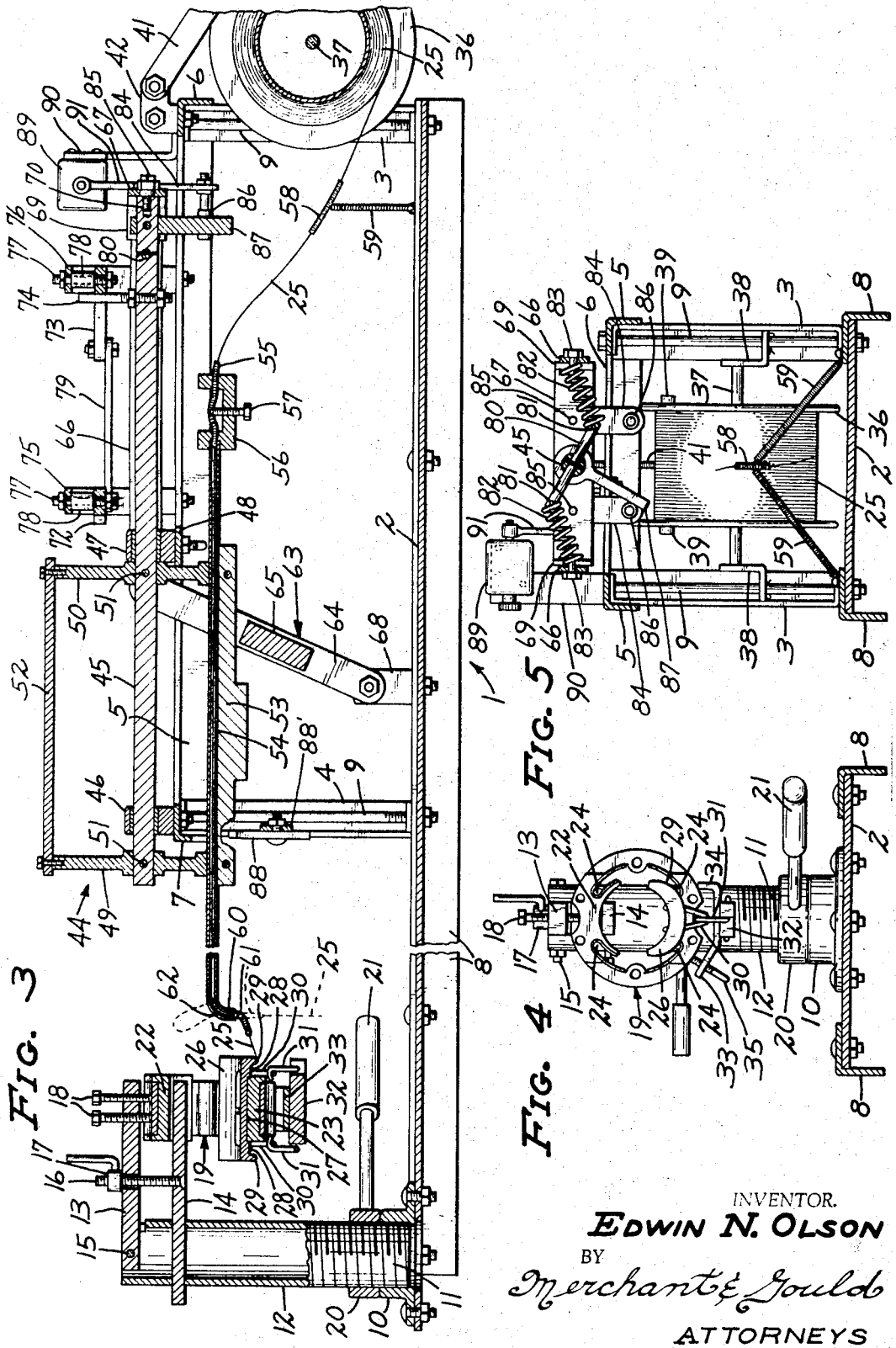

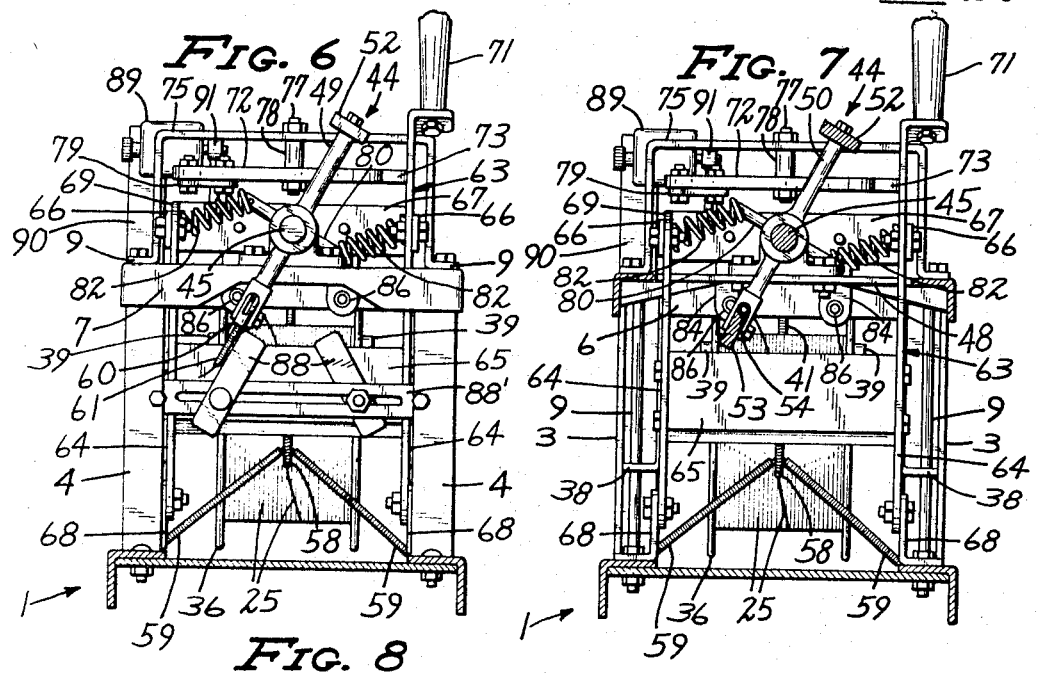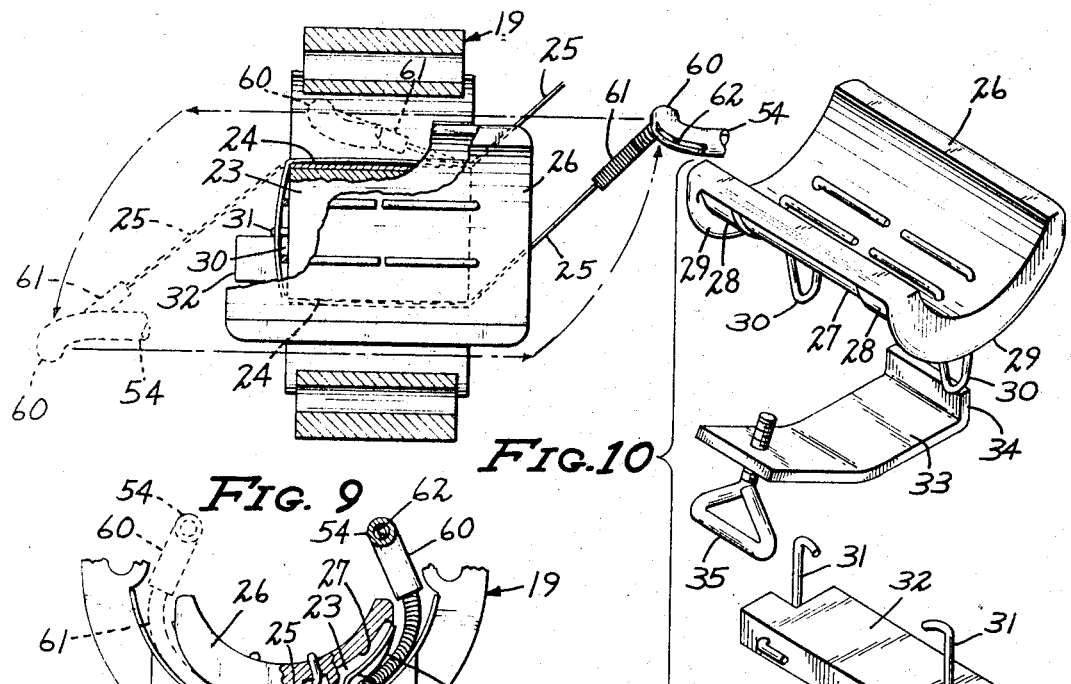

United States Patent Office 3,450,357
Patented June 17, 1969

3,450,357
STATOR WINDING DEVICE
Edwin N. Olson, 109 1st St. SE., Minot, N. Dak. 58701
Filed Mar. 13, 1967, Ser. No. 622,557
Int. Cl. B65h *81/06*
U.S. Cl. 242—1.1
14 Claims

ABSTRACT OF THE DISCLOSURE

A device for winding coils of wire on the stator of an electric motor or generator, including a stator mounting means and a wire carrying shuttle mounted for reciprocatory movements axially of the stator and oscillatory movements transversely of the direction of reciprocatory movements. Cam elements, for imparting oscillatory movements to the shuttle, are adjustable to vary the extent of, and reverse the direction of said oscillatory movement relative to the direction of said reciprocatory movement of the shuttle. A flexible wire discharge tube, and a die member adapted to be mounted on the stator, cooperate to guide wire into coils of predetermined shape in the stator.

Background of the invention

Heretofore, various coil winding devices for stators have been produced, utilizing wire feeding reciprocatory and ocsillating shuttles, with cam arrangements for imparting such movements to the shuttle. Such devices are disclosed in U.S. patents such as 1,997,828, 2,573,976, 2,579,585, 2,954,117, 3,081,043, 3,082,966, 3,102,696 and others. Machines as therein disclosed involve, for the most part, relatively heavy and complex mechanisms, requiring considerable time and effort to adjust the same to winding coils in motor components of different sizes and shapes.

Summary of the invention

This invention provides a stator winding device which is simple and inexpensive to produce, and which is light in weight enabling the same to be easily moved from place to place. The device of this invention includes a frame structure, means on one end of the frame structure for mounting a stator, a wire carrying shuttle mounted in the frame structure for reciprocatory movements axially toward and away from the stator mounted on said means and for oscillatory movements transversely of the direction of reciprocatory movements. The shuttle includes a wire guide element having a flexible resilient wire discharge tube at its outlet end and disposed to move through the stator to wind a coil of wire therein smoothly and without backlash, the resilience of the discharge tube maintaining the wire under tension during changes of direction of movement of the shuttle. Tension is applied to the wire by means including an adjustable braking element on the shuttle for frictionally engaging the wire to retard movement of the wire through the shuttle to the flexible discharge tube thereof.

Means is provided for adjusting the extent of, and for reversing the direction of oscillatory movement of the shuttle, and die means is provided for mounting on a stator, whereby to guide wire into a coil of predetermined shape at axially opposite ends of the stator being wound.

Referring to the drawings, in which like reference characters indicate like parts throughout the several views:

FIG. 1 is a view in top plan of a stator winding device produced in accordance with this invention, some parts being broken away;

FIG. 2 is a view in side elevation, some parts being broken away;

FIG. 3 is an enlagred longitudinal section, taken substantially on the line 3 of FIG. 1, some parts being broken away;

FIGS. 4, 5, 6 and 7, are views in transverse section, taken on lines 4—4, 5—5, 6—6 and 7—7 respectively, of FIG. 2;

FIG. 8 is an enlarged fragmentary section, taken substantially on the line 8—8 of FIG. 2, some parts being broken away;

FIG. 9 is an enlagred fragmentary view corresponding to a portion of FIG. 4, some parts being broken away and some parts being shown in sections; and FIG. 10 is an exploded perspective view of a die member and clamping means therefor, of this invention.

In the preferred embodiment of the invention illustrated, the numeral 1 indicates, in its entirety, a frame structure including an elongated base 2, a pair of laterally spaced upright legs 3 at one end of the base 2, a second pair of laterally spaced upright legs 4, extending upwardly from the base 2 intermediate the ends of the base, a pair of laterally spaced longitudinal frame members 5 connecting the upper ends of the legs 3 to the upper ends of the legs 4, and cross frame members 6 and 7 connecting the upper ends of the legs 3 and the upper ends of the legs 4 respectively. The frame members 5, 6 and 7, as well as the legs 3 and 4, are preferably made from rigid material such as commercially available angle iron or the like. The base 2 includes a pair of longitudinally extending side members or angle bars 8 bolted or otherwise rigidly secured to opposite side edges of the base 2, and the top frame members 5, 6 and 7 as well as the legs 3 and 4 are secured together and to the base 2 by elongated nut-equipped bolts or the like 9.

A flanged open-topped screw threaded socket 10 is bolted or otherwise rigidly secured to the base 2 at the end thereof opposite the legs 3, for reception of the lower threaded end portion 11 of an upright tubular standard 12. The upper end portion of the standard 12 is formed to receive upper and lower generally horizontally disposed clamping bars 13 and 14 respectively, the former being pivotally mounted on the standard 12 on a horizontal axis extending transversely of the frame 1, as indicated at 15. The clamping bars 13 and 14 are connected by a clamping screw 16 having screw threaded thereon a handle-equipped clamping nut 17. The upper clamping bar or jaw 13 is provided with a pair of adjustment screws 18 which cooperate with the lower clamping bar 14 to securely hold a motor stator 19 with the axis thereof extending longitudinally of the frame 1. The standard 12 and parts carried thereby is vertically adjusted to locate the stator 19 at a proper level for winding, by rotating the standard 12 relative to the socket 10. A lock nut or ring 20, provided with a handle 21, is screw threaded on the threaded portion 11 and engages the socket 10 to securely but releasably lock the standard 12 and parts carried thereby in desired set position.

For the purpose of the present example, the stator 19 is shown as having a pair of diametrically opposed pole pieces 22 and 23, the former of which is held between the clamping bars 13 and 14, the latter being positioned for the winding of the coil of wire thereon. The stator 19 with its pole pieces 22 and 23 defines a plurality of circumferentially opening grooves 24 that extend axially for the full axial length of the stator 19 and which receive the field windings or coils, the wire forming the coils being indicated at 25.

For the purpose of forming the opposite end portions of the coil of wire 25, adjacent opposite ends of the stator 19, I provide a die member 26 having a radially outer curved surface 27 intermediate its ends, the surface 27 seating on the arcuate radially inner surface of the pole piece 23. Axially outwardly of the surface 27, the die member 26 is formed to provide arcuate guide surfaces 28 and radially outwardly projecting end flanges 29 which cooperate to confine and form the opposite end portions of the coils of wire 25 as they are wound on the pole pieces. The die member 26 is provided with a pair of axially spaced radially outwardly projecting loops or eyes 30 that are disposed adjacent opposite ends of the stator 19 when the die member 26 is mounted thereon. A pair of hook elements 31 are pivotally mounted at opposite ends of a clamp-engaging member 32 that underlies the stator 19, each of the hooks 31 being receivable in a different one of the loops or eyes 30. A clamp 33 is interposed between the clamp-engaging member 32 and the bottom portion of the stator 19, the clamp 33 having an upwardly projecting stator-engaging flange 34 at one end and a stator engaging thumb screw or the like 35 adjacent its opposite end. As shown particularly in FIG. 9, the clamp 33 is interposed between the stator 19 and the member 32, tightening of the thumb screw 35 causing the die member 26 to be securely anchored on the adjacent pole piece 23.

The wire 25 is supplied for winding on the stator 19 from a reel or spool 36 that is journaled on a shaft 37 mounted at its opposite ends in brackets 38 that are suitably mounted on the end legs 3 and project outwardly therefrom longitudinally of the frame 1. Over-running of the spool 36 is prevented by a pair of sleeves 39 of rubber or the like, which engage the peripheral edges of the spool 36 and which are mounted on a cross shaft 40 that is rigidly secured to the intermediate portion of a bar 41 having its inner end pivotally secured to a bracket 42 mounted on the end transverse frame member 6. At its outer end, the bar 41 is provided with a weight element 43 by means of which sufficient pressure is exerted on the spool 36 by the sleeves 39 to prevent over-running of the spool 36.

A shuttle 44 for feeding wire 25 from the spool 36 to the stator 19, and for winding the wire on the stator 19, is mounted in the frame 1 for reciprocatory movements longitudinally of the base 2 and for oscillatory swinging movements transversely of the direction of said reciprocatory movements. The shuttle 44 comprises an elongated shaft 45 that is mounted in bearings 46 and 47 for axial and rotary movements, the bearing 46 being mounted on the intermediate transverse frame member 7, the bearing 47 being bolted or otherwise rigidly secured to a cross frame member 48 connected at its opposite ends to the frame members 5 intermediate the transverse frame members 6 and 7. The shuttle 44 further includes a pair of axially spaced arms 49 and 50 having apertures through their intermediate portion through which the shaft 45 extends. The arms 49 and 50 are pinned or otherwise rigidly secured to the shaft 45, as indicated at 51, for common movements therewith. The arms 49 and 50 extend generally upwardly and downwardly and are connected at their upper ends by a bar 52 by means of which the shaft 45 may be manually oscillated, if desired. The bar 52 further serves as a handle whereby the machine may be carried from place-to-place. At their lower ends, the bars 49 and 50 are connected by an elongated slide member 53 in which is mounted an elongated tubular wire guide element 54 disposed in radially downwardly spaced parallel relationship to the shaft 45. At its inlet end, the guide element 54 has connected thereto a flexible resilient inlet tube 55 preferably made from coiled spring wire or the like. A generally U-shaped yoke 56 is mounted on the inlet tube 55 and has screw threaded therein an adjustment screw 57 one end of which engages the intermediate portion of the flexible inlet tube 55 to laterally outwardly bow the same, see particularly FIG. 3. By thus bowing the intermediate portion of the inlet tube 55 with respect to the opposite ends thereof, wire 25 passing through the inlet tube 55 and wire guide tube 54 frictionally engages portions of the inner wall surface of the inlet tube 55 in such manner that free movement of the wire 25 through the guide tube 54 is retarded to any desired extent. Intermediate the inlet tube 55 and the spool 36, the wire 25 passes through a second guide tube 58 similar to the inlet tube 55, the tube 58 being connected to the base 2 by a pair of coil tension springs 59 which permit limited lateral movement of the tube 58 but which tend to center the same laterally of the frame 1.

At its outlet end, the tubular wire guide element 54 is bent to provide an elbow portion 60 to which is secured a flexible resilient discharge tube 61 made from coiled spring wire or the like. The discharge tube 61 normally extends in a direction radially of the guide tube 54, as shown by dotted lines in FIG. 3. The elbow portion 60 is provided with a slot opening 62 for facilitating the threading of wire 25 through the guide tube 54 and discharge tube 61. As shown by dotted lines in FIG. 3, when the wire 25 is initially threaded through the guide tube 54, the leading end of the wire 25 projects outwardly through the slot opening 62. The operator then grasps the wire 25 and forms the same into a loop, threading the leading end downwardly through the opening 62 into and through the discharge tube 61. The wire 25 is then pulled through the discharge tube 61 until the earlier formed loop disappears into the elbow portion 60 of the guide tube 54. Before initiating the winding operation, the leading end of the wire 25 is temporarily tied to any convenient portion of the machine, such as to the lock ring handle 21, as shown in FIGS. 1 and 2.

Means for imparting reciprocatory movement to the shuttle 44, axially of the shaft 45, comprises a bifurcated crank 63 including a pair of laterally spaced crank arms 64 and a cross bar 65 connecting the intermediate portions of the arms 64, a pair of pitman arms 66 and a transverse member 67. The crank arms 64 are pivotally connected to brackets 68 mounted on the base 2, for swinging movements on a horizontal axis extending transversely of the base 2. At their upper ends, the crank arms 64 are each pivotally connected to one end of a different one of the pitman arms 66, the pitman arms 66 extending longitudinally of the frame 1 in laterally outwardly spaced parallel relation to the shaft 45. The opposite ends of the pitman arms 66 are pivotally connected to end flanges 69 of the transverse member 67, the intermediate portion of the member 67 being rotatably secured to the adjacent end of the shaft 45 by a mounting screw or the like 70. One of the crank arms 64 is provided with a handle 71 by means of which reciprocatory movement may be manually imparted to the shuttle 44 through the crank 63 and pitman arms 66.

Means for imparting oscillatory swinging movements to the shuttle 44, at opposite ends of its reciprocatory movement, comprises a pair of elongated arcuate cam elements 72 and 73, and a cam follower element in the nature of a pin 74 mounted in and projecting radially from the shaft 45. The cam elements 72, 73 extend generally transversely of the frame 1 and are each pivotally mounted generally centrally between their opposite ends to a respective one of a pair of hanger brackets 75 and 76, by means of nut equipped bolts or the like 77 and tubular spacers 78. The hanger brackets 75 and 76 are of inverted generally U-shape being secured at their opposite ends to the side frame members 5 and supporting the cam elements 72 and 73 in overlying spaced relationship to the shaft 45. The cam elements 72 and 73 are rotatably adjusted on the vertical axes of their respective mounting screws 77 and adapted to be releasably locked against such rotation by tightening the nuts on the screws 77. Preferably, and as shown, the cam elements 73 are pivotally connected at one of their ends by a connector rod 79, whereby the cam elements 72 and 73 are simultaneously adjustably rotated.

During movement of the shuttle 44 in one direction of its reciprocatory movement, the elbow portion 60 of the wire guide element 54, together with the discharge tube 61, moves axially through the stator 19 at one side of the die member 26. As the shuttle approaches its limit of movement in said one direction, wherein the discharge tube 61 is disposed axially outwardly of the stator 19, the cam follower pin 74 engages the adjacent one of the cam elements 72 or 73 whereby to oscillate the shuttle in one direction generally transversely of the direction of reciprocatory movement thereof, whereby to dispose the discharge tube 61 adjacent the opposite side of the die member 26, as shown in FIG. 8. Then, when the shuttle 44 is moved in the opposite direction of its reciprocatory movement, the flexible discharge tube 61 moves in a direction axially through the stator 19 and adjacent said opposite side of the die member 26 whereupon the cam follower pin 74 engages the opposite one of the cam elements 72 and 73 to impart oscillatory movement to the shuttle 44 in the opposite direction to again dispose the flexible discharge tube 61 adjacent said one side of the die member. Thus, with repeated reciprocatory and oscillatory movements of the shuttle 44, a coil of wire is wound on the pole piece 23 within the grooves 24 thereof. The frictional drag applied to the wire by the bending of the inlet tube 55 at the inlet end of the guide element 54 places the wire 25 under sufficient tension to bend the flexible discharge tube 61 so that the discharge tube 61 prevents backlash of the wire 25, and passes through the grooves 24 to lay the wire 25 therein in uniform coils. During oscillatory movement of the shuttle 44, the wire 25 is guided into engagement with the arcuate surfaces 28 of the die member 26, so that the opposite ends of the coil are disposed radially outwardly of the inner arcuate surface of the adjacent pole piece 23. When the required number of turns of the wire 25 are coiled about the pole piece 23, the thumb screw 35 is loosened to permit disengagement of the hooks 31 from the loops or eyes 30, whereupon the die member 26 may be moved radially inwardly of the stator 19 to disengage the eyes 30 from between the opposite ends of the stator and the adjacent end portions of the coil, after which the die member 26 may be moved axially outwardly from the stator 19.

It will be noted that, when winding coils having substantial width or dimension generally circumferentially of the stator, the curvature of the cam elements 72 and 73 is such that they become ineffective to move the cam follower pin 74 to the full lateral distance required. For the purpose of aiding the cams to impart full oscillatory movement to the shuttle 44, I provide an arm 80 that extends diametrically through the shaft 45 and is rigidly secured therein, the arm 80 projecting radially outwardly from opposite sides of the shaft 45 and having abutment pins 81 at the opposite ends thereof for engagement with the inner ends of a pair of toggle-acting springs 82. The outer ends of the springs 82 abut adjacent ones of the pitman arms 66 and are held in place by pins or bolts 83, see particularly FIG. 5. The arm 80 is so disposed relative to the cam follower pin 74, that the toggle-acting springs 82 yieldingly urge the shuttle toward its limits of oscillatory movement when the shuttle is moved to one side or another of a neutral or dead center position. Adjustable means for limiting said oscillatory movement of the shuttle comprises a pair of laterally spaced stop bars 84 that are pivotally connected at their upper ends to the transverse member 67 by bolts or the like 85 which may be tightened to lock the stop bars 84 against pivotal movement. The lower ends of the stop bars 84 are provided with abutment portions 86 disposed in the path of oscillatory movement of a radial member 87 securely mounted on the shaft 45 for common oscillatory movements therewith.

For the purpose of preventing accidental oscillatory movement of the shuttle 44 during the greater portion of reciprocatory movement thereof, I provide a pair of guide members 88 that are laterally adjustably mounted on a slotted cross bar 88' that is bolted or otherwise rigidly secured at its opposite ends to the intermediate legs 4, see particularly FIG. 6. The guide members 88 alternately slidably engage the slide member 53 of the shuttle during reciprocatory movement thereof in opposite directions, to positively prevent oscillatory movement of the shuttle toward its neutral or dead center relationship, thus effectively preventing the elbow portion 60 and discharge tube 61 from possible damage by striking the die member 26 or parts of the stator 19 during said reciprocatory movement of the shuttle. A conventional counting device 89 is mounted on the frame 1 by means of a bracket 90, and is provided with the usual actuator arm 91 that is engaged by the transverse member 67 at one limit of reciprocatory movement of the shuttle 44.

From the above, it should be obvious by adjusting the height of the standard 12, stators of various diameters may be wound with the device of this invention. Further, the length of stroke or reciprocatory movement of the shuttle 44 is sufficient to accommodate stators of various axial dimensions. It will be understood that die members 26 of various sizes may be provided to accommodate stators of various sizes and pole piece characteristics. Further, adjustment of the cam elements 72 and 73, as well as the stop bars 84 and guide members 88 render the device adaptable to the winding of pole pieces of various circumferential dimensions. It will be noted that, by moving the cam elements 72 and 73 in a clockwise direction with respect to FIG. 1, to a given extent, the direction of oscillatory movement of the shuttle 44 will be reversed with respect to the direction of reciprocatory movement of the shuttle. Thus, the machine is quickly and easily adapted to wind right and left-hand coils with a minimum of time spent in adjusting the machine for this purpose.

What is claimed is:
1. A stator winding device comprising:
   (a) frame structure including an elongated base;
   (b) stator mounting means on one end of said base;
   (c) a shuttle including a wire guide element extending longitudinally of said base and having opposite inlet and outlet ends;
   (d) means mounting said shuttle on said frame structure for reciprocatory movement longitudinally of said base and axially of a stator mounted in said stator mounting means, and for oscillatory movement in directions generally transversely of the direction of said reciprocatory movement;
   (e) means for imparting reciprocatory movement to said shuttle;
   (f) cam means and a cooperating cam follower element, one on said frame structure and the other on the shuttle for imparting said oscillatory movement to the shuttle adjacent opposite limits of reciprocatory movement of the shuttle and responsive to said reciprocatory movement, said cam means comprising a pair of cam elements mounted for pivotal movements in directions to vary the length of oscillatory movement imparted to said shuttle;
   (g) means for releasably locking said cam elements in desired positions of said movement thereof;
   (h) and a wire discharge element mounted on the discharge end of said wire guide element for common movements therewith and extending angularly therefrom, said wire discharge element having a discharge end disposed to move in opposite directions generally transversely of the direction of reciprocatory shuttle movement axially outwardly of the opposite ends of a stator on said stator mounting means responsive to oscillatory movement of the shuttle.

2. The stator winding device defined in claim 1, characterized by adjustable means for applying braking movement to wire traveling through said wire guide element, comprising a flexible resilient inlet tube at the inlet end of said wire guide element, a yoke on said inlet tube, and an adjustable element on said yoke movable transversely of the inlet tube in a direction to laterally bow an intermediate portion of said inlet tube relative to the opposite ends thereof.

3. The stator winding device defined in claim 1, in which said cam follower is mounted on the shuttle, said cam elements being mounted on the frame structure for said pivotal movement thereof.

4. The stator winding device defined in claim 3, characterized by a rigid link connecting said cam elements for common pivotal movements.

5. The stator winding device defined in claim 4, in which said cam elements comprise elongated cam arms pivotally mounted to said frame structure generally centrally between opposite ends of said cam arms and on parallel axes normal to the axis of oscillatory movement of the shuttle, said cam arms having cam surfaces of substantially uniform curvature for the cam follower engaging length thereof and commonly movable on said parallel axes to opposite sides of a neutral position wherein no oscillatory movement is imparted to the shuttle, whereby to reverse the direction of oscillatory movement of the shuttle relative to the direction of reciprocatory movement thereof.

6. The stator winding device defined in claim 1, in which said shuttle includes an elongated shaft journalled in said frame structure on an axis extending longitudinally of said base for rotary and axial sliding movements relative to said frame structure, said wire guide element comprising a rigid tube secured to said shaft in radially spaced parallel relationship thereto.

7. The stator winding device defined in claim 6, characterized by stop means limiting oscillatory movement of said shuttle, and means cooperating with said cam means to impart said oscillatory movement to the shuttle and comprising, an arm projecting radially from diametrically opposite sides of said shaft, and a pair of toggle-acting springs engaging said arm and disposed to urge said shaft toward opposite limits of said oscillatory movement when the shaft oscillates to opposite sides of a dead center position between said limits of oscillatory movement.

8. The stator winding device defined in claim 6, in which said means for imparting reciprocatory movement to the shuttle comprises, a transverse member having an intermediate portion journalled on said shaft, a rigid bifurcated crank having one end pivotally secured to said base on an axis extending transversely of said shaft axis, and a pair of laterally spaced parallel pitman arms pivotally connected to said crank and to said transverse member in radially spaced relation to said shaft, said pitman arms extending generally longitudinally of said shaft.

9. The stator winding device defined in claim 8, characterized by stop means limiting oscillatory movement of the shuttle and comprising, a radial member secured to said shaft for common reciprocatory and oscillatory movements therewith, and a pair of laterally spaced stop bars mounted on said transverse member for adjustment toward and away from each other transversely of the shaft, said stop bars having portions lying in the path of travel of said radial member for engagement therewith.

10. The stator winding device defined in claim 1 in which said stator mounting means comprises a stator engaging clamp and a standard mounting said clamp for movements relative to said base in directions transversely of the direction of reciprocatory movement of said shuttle.

11. The stator winding device defined in claim 10, characterized by a threaded socket in said base, said standard having a threaded lower end portion screw threaded in said socket, and a lock nut on said lower end portion of the standard and engaging said socket to releasably lock said standard against movement relative to the socket.

12. The stator winding device defined in claim 1, in which said die member provides arcuate radially outer surface portions disposed to extend axially from opposite ends of a stator pole piece for guiding wire in arcuate paths generally concentric with the stator responsive to oscillatory movement of the shuttle.

13. The stator winding device defined in claim 1, in which said die member mounting means comprises a pair of hook elements, a cooperating pair of eye elements, and a clamp, one of said pair of elements being mounted on said die member, the other of said pair of elements being operatively associated with said clamp and each having hooking engagement with a different element of said one of said pair of elements.

14. The stator winding device defined in claim 13, characterized by a clamp engaging member, said eye elements being mounted in said die member and said hook elements being pivotally mounted in said clamp-engaging member for movements toward and away from hooking engagement with said eye elements, said clamp being adapted to be interposed between said clamp-engaging member and a stator when said die member is mounted on the stator, to rigidly anchor the die member thereto.

References Cited

UNITED STATES PATENTS

| | | | |
|---|---|---|---|
| 1,977,828 | 10/1934 | Laib et al. | 242—1.1 |
| 2,328,725 | 9/1943 | Knobel | 242—1.1 |
| 2,632,602 | 3/1953 | Weis | 242—1.1 |
| 2,791,121 | 5/1957 | Morrill | 74—23 |
| 2,934,280 | 4/1960 | Mason | 242—1.1 |
| 2,967,672 | 1/1961 | Zwayer | 242—1.1 |
| 3,104,070 | 9/1963 | Achtmeyer et al. | 242—1.1 |
| 3,179,346 | 4/1965 | Weis | 242—1.1 |

BILLY S. TAYLOR, *Primary Examiner.*

U.S. Cl. X.R.

74—23